United States Patent
Takahashi

(10) Patent No.: US 10,194,043 B2
(45) Date of Patent: Jan. 29, 2019

(54) APPARATUS AND METHOD OF DETECTING DECOLORATION INK IMAGE

(71) Applicants: KABUSHIKI KAISHA TOSHIBA, Tokyo (JP); TOSHIBA TEC KABUSHIKI KAISHA, Tokyo (JP)

(72) Inventor: Kazunobu Takahashi, Suntou Shizuoka (JP)

(73) Assignees: KABUSHIKI KAISHA TOSHIBA, Tokyo (JP); TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/829,881

(22) Filed: Aug. 19, 2015

(65) Prior Publication Data

US 2016/0070997 A1   Mar. 10, 2016

(30) Foreign Application Priority Data

Sep. 5, 2014   (JP) ................. 2014-181138

(51) Int. Cl.
*H04N 1/40* (2006.01)
*H04N 1/00* (2006.01)
*H04N 1/54* (2006.01)
*H04N 1/62* (2006.01)

(52) U.S. Cl.
CPC .......... *H04N 1/00801* (2013.01); *H04N 1/54* (2013.01); *H04N 1/62* (2013.01)

(58) Field of Classification Search
CPC ................................. H04N 1/00801
See application file for complete search history.

(56) References Cited

U.S. PATENT DOCUMENTS

| 8,538,317 | B2 | 9/2013 | Iguchi | |
| 2011/0205601 | A1* | 8/2011 | Akimoto | G03G 21/046 358/475 |
| 2012/0149562 | A1* | 6/2012 | Iguchi | H04N 1/0032 503/201 |
| 2012/0306985 | A1 | 12/2012 | Iguchi et al. | |
| 2013/0001050 | A1* | 1/2013 | Oshiro | G03G 21/00 198/780 |
| 2015/0054905 | A1* | 2/2015 | Saino | B41J 29/36 347/179 |

(Continued)

OTHER PUBLICATIONS

Japanese Office Action dated Dec. 7, 2017, filed in counterpart Japanese Patent Application No. 2014-181138, 6 pages (with machine translation).

(Continued)

*Primary Examiner* — King Poon
*Assistant Examiner* — Michael Burleson
(74) *Attorney, Agent, or Firm* — Patterson & Sheridan, LLP

(57) ABSTRACT

According to an embodiment, a detection apparatus for detecting a decoloration ink image includes an image reading unit, a decoloration unit, and a controller. The controller acquires image data using the image reading unit before decoloration that is the image data on the sheet before decoloration processing is executed by the decoloration unit. In addition, the controller determines whether or not there is a difference between the image data to be decolored and the decolored image data, thereby determining whether or not the decoloration ink is used in the sheet.

9 Claims, 22 Drawing Sheets

(56) References Cited

U.S. PATENT DOCUMENTS

2015/0343794 A1* 12/2015 Shoda ................. B41J 2/32
  347/179
2016/0033886 A1* 2/2016 Aoki ................ G03G 9/0821
  399/321

OTHER PUBLICATIONS

Chinese First Office Action dated Nov. 6, 2017, filed in counterpart Chinese Patent Application No. 201510544257.8, 16 pages (with translation).

* cited by examiner

APPARATUS AND METHOD OF DETECTING DECOLORATION INK IMAGE

CROSS-REFERENCE TO RELATED APPLICATIONS

This application is based upon and claims the benefit of priority from the prior Japanese Patent Application No. 2014-181138, filed on Sep. 5, 2014, the entire contents of which are incorporated herein by reference.

FIELD

An embodiment described herein generally relates to an apparatus and a method of detecting a decoloration ink image printed on a sheet using decoloration ink.

BACKGROUND

There is known a writing material and a printing apparatus using decoloration ink. The decoloration ink is decolored by heat, light or chemical processing. Accordingly, characters and figures described or printed with the decoloration ink are decolored by heat, light or chemical processing, and are visually erased.

There are documents where the decoloration ink is unsuitably used such as a deed, a ledger sheet and a medical record. For tamper-proof, it is desirable that the description with the decoloration ink on the above-described documents be detected at the early stage. It may be desirable that a person could recognize the use of the decoloration ink only by seeing. However, in many cases, it is difficult to identify the use of the decoloration ink only by a visual observation.

DETAILED DESCRIPTION

Figure 1:
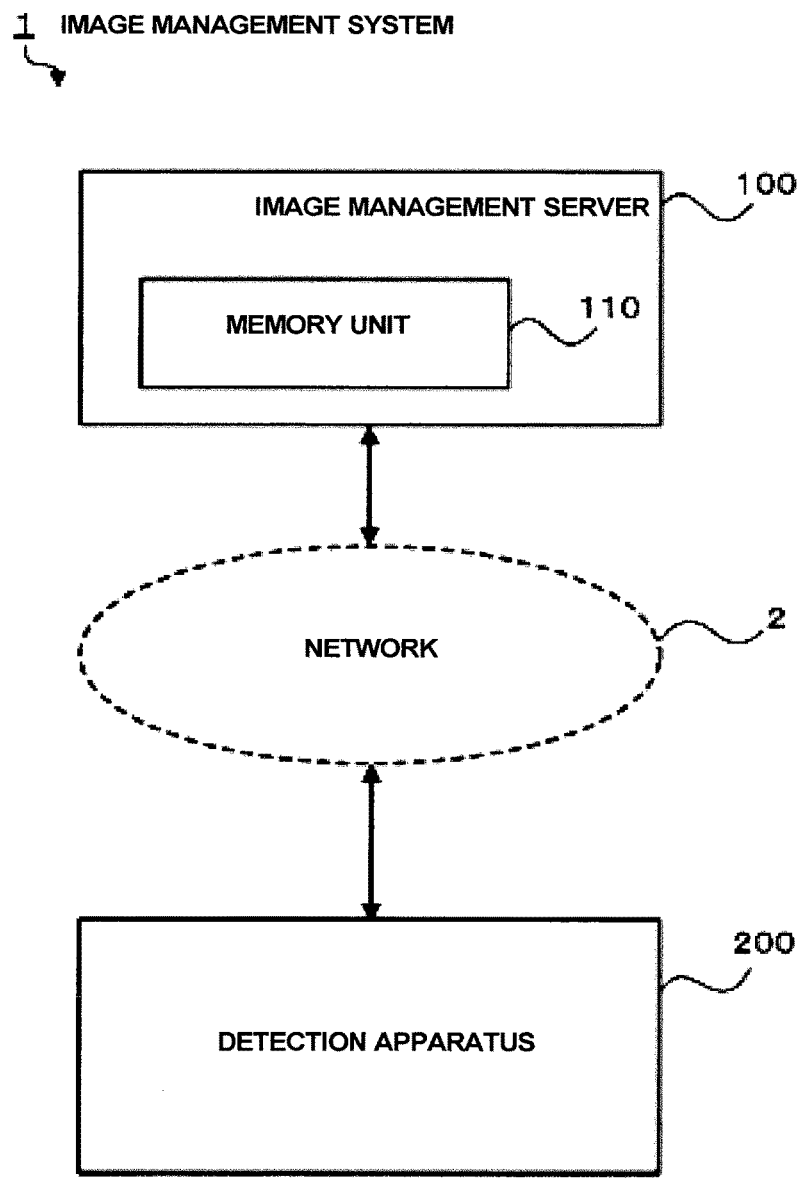
FIG. 1 is an image management system including a detection apparatus of a decoloration ink image according to a first embodiment.

According to one embodiment, a detection apparatus for detecting a decoloration ink image includes an image reading unit, a decoloration unit, and a controller. The image reading unit reads an image printed on a sheet. The decoloration unit decolors a decoloration ink image section that is printed with decoloration ink on the image printed on the sheet. The controller acquires image data using the image reading unit before decoloration that is the image data on the sheet before decoloration processing is executed by the decoloration unit. In addition, the controller acquires image data using the image reading unit after decoloration that is the image data on the sheet after the decoloration processing is executed. Furthermore, the controller determines whether or not there is a difference between the image data to be decolored and the decolored image data, thereby determining whether or not the decoloration ink is used on the sheet.

Hereinafter, embodiments will be described with reference to the drawings. In the drawings, the same reference numerals denote the same or similar parts.

Embodiment 1

FIG. 1 is an image management system including a detection apparatus of a decoloration ink image according to a first embodiment. Hereinafter, the detection apparatus of the decoloration ink image refers simply to a detection apparatus. An image management system 1 includes an image management server 100 and a detection apparatus 200. The image management server 100 is connected to the detection apparatus 200 via a network 2. Here, the network is a communication network including a LAN (Local Area Network), a WAN (Wide Area Network), a telephone network (such as a mobile phone network and a fixed telephone network), a regional IP network or the Internet.

The image management server 100 is a server apparatus such as a PC server, a UNIX (registered trademark) server and a main frame. The image management server 100 includes a memory unit 110. The memory unit 110 is a data readable/writable memory device such as a DRAM (Dynamic Random Access Memory), an SRAM (Static Random Access Memory), a flash memory and a hard disk. Once the image management server 100 receives the image data from the detection apparatus 200, the image data received is stored in the memory unit 110. At this time, the image management server 100 systematically stores the image data utilizing a database or an index in order to improve a searching property of the image data. Also, the image management server 100 has an unauthorized access prevention function such as a login restriction function in order to assure confidentiality of the image data.

The detection apparatus 200 is an apparatus for detecting the use of the decoloration ink on the sheet where the use of the decoloration ink is unsuitable such as a deed, a ledger sheet, a medical record, an examination paper and a ballot paper. In other words, the detection apparatus 200 uses the decoloration ink to detect the decoloration ink image printed on the sheet. The decoloration ink is a visually erasable ink that is decolored by heat, light or chemical processing. For example, the decoloration ink is decolored by heating at a predetermined temperature or more (hereinafter a decoloration temperature), irradiating light having a predetermined wavelength component such as ultraviolet ray, or applying erasable ink as an eraser including predetermined components. Note that the decoloration ink includes not only liquid ink, but also powder ink. The powder decoloration ink is, for example, a decoloration toner. In the description below, the decoloration ink is decolored by heat.

Figure 2:
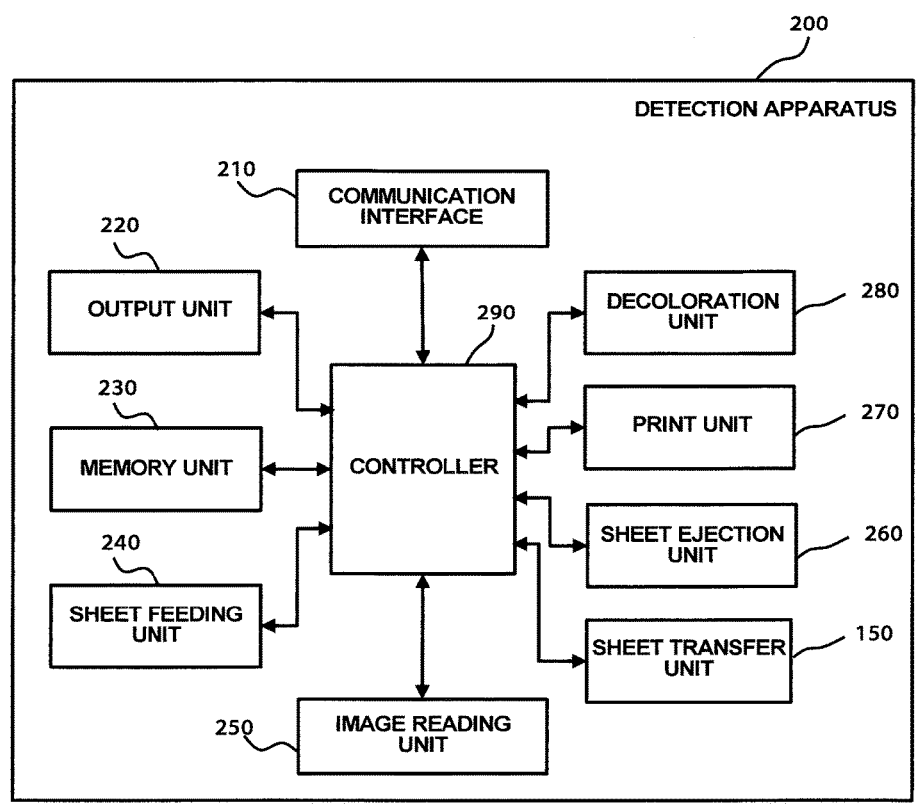
FIG. 2 is a block diagram of the detection apparatus of the decoloration ink image according to the first embodiment.

The detection apparatus 200 includes a communication interface 210, an output unit 220, a memory unit 230, a sheet feeding unit 240, an image reading unit 250, a sheet ejection unit 260, a print unit 270, a decoloration unit 280, and a controller 290, as shown in FIG. 2.

The communication interface 210 is a network connection apparatus for connecting the detection apparatus 200 to the network 2. The communication interface 210 functions as a communication unit of the detection apparatus 200. The communication interface 210 is a LAN connection apparatus connecting to a router via a LAN cable, or a wireless LAN connection apparatus connecting to a wireless LAN base unit via wireless, for example. The communication interface 210 communicates with the image management server 100 based on a control by the controller 290.

The output unit 220 is a device for outputting a variety of information to a user. For example, the output unit 220 is a display device such as a liquid crystal display and an organic electro-luminescent (EL) display. Also, the output unit 220 may be a lighting device such as a sound generation device, e.g., a speaker or a buzzer and a LED (Light Emitting Diode) lamp. The output unit 220 notifies the user of a variety of information based on the control by the controller 290.

The memory unit 230 is a data readable/writable memory device such as a DRAM, an SRAM, a flash memory and a hard disk. The memory unit 230 stores a variety of setting data used by the controller 290 and image data read by the image reading unit 250.

Figure 3:
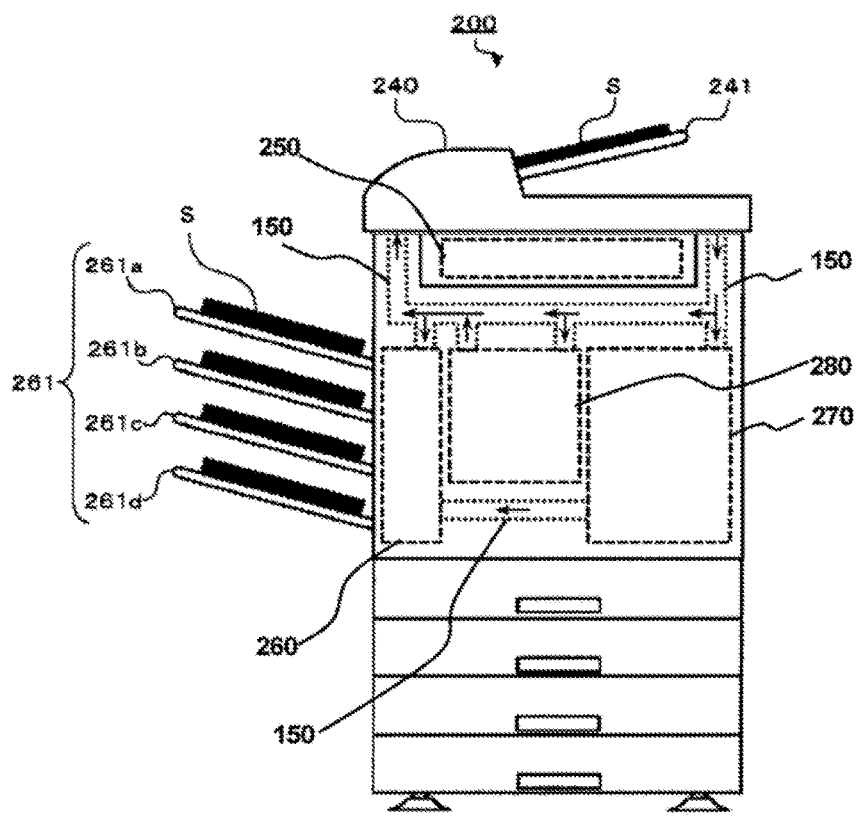
FIG. 3 is a schematic diagram showing a main part of the detection apparatus of the decoloration ink image according to the first embodiment.

The sheet feeding unit 240 is a device for loading sheets from outside and transferring the sheets to inside of the detection apparatus 200. The sheet feeding unit 240 is an auto document feeder for sequentially loading sheets S to be detected set on a sheet feeding tray 241 to inside of the detection apparatus 200 as shown in FIG. 3, for example. The sheet feeding unit 240 loads the sheets S one by one from the sheet feeding tray 241 based on the control by the controller 290 to inside of the detection apparatus 200.

The image reading unit 250 is an image reading apparatus for reading images printed on the sheets S. For example, the image reading unit 250 is an image capturing device such as a scanner and a camera. The image reading unit 250 reads the images of the sheets S loaded by the sheet feeding unit 240 based on the control by the controller 290, and stores the image data of the sheets S in the memory unit 230.

The sheet ejection unit 260 is a device for ejecting the sheets S inside of the detection apparatus 200 to outside of the detection apparatus 200. The sheet ejection unit 260 includes at least, for example, transfer rollers for transferring the sheets S and motors for rotating the transfer rollers. At the detection apparatus 200, a stacker 261 is disposed. The stacker 261 includes a plurality of sheet ejection trays (261*a* to 261*d* shown in FIG. 3). The sheet ejection unit 260 ejects the sheets S to any of sheet ejection trays 261*a* to 261*d* based on the control by the controller 290. Note that the number of the sheet ejection trays is not limited to four. The number of the sheet ejection trays may be four or more or less than four.

The print unit 270 is a printing device for printing the sheet S. The print unit 270 is, for example, a laser printer including a transfer unit (not shown) for transferring a toner image developed on an image carrier such as a photoconductor drum to the sheet S, and a fixing unit (not shown) for fixing the toner image transferred to the sheet S by heat and pressure. The fixing unit includes, for example, a heat roller for heating the sheet S to a fixing temperature where the toner image can be at least fixed to the sheet S, and a pressure roller for applying a pressure to the sheet S. The print unit 270 prints a highlight image as described later to the sheet S loaded to inside of the detection apparatus 200 based on the control by the controller 290.

Figure 4:
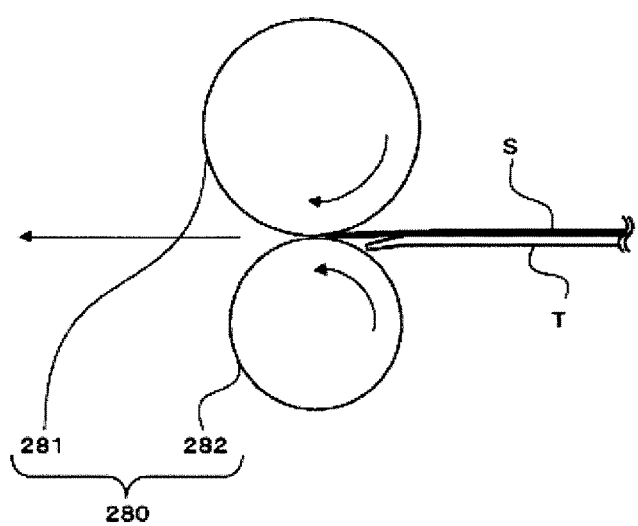
FIG. 4 is a decoloration unit of the detection apparatus of the decoloration ink image according to the first embodiment.

The decoloration unit 280 is a decoloration apparatus for decoloring a decoloration ink image section (image section printed with decoloration ink) on the image printed on the sheet S. For example, the decoloration unit 280 includes a heat roller 281 for heating the sheet S at the decoloration temperature or more, and a pressure roller 282 for applying a pressure to the sheet S, as shown in FIG. 4. The decoloration unit 280 heats the sheet S transferred along a transfer path T. The decoloration unit 280 decolors the decoloration ink image section on the sheet S by heating, for example, an entire surface of the sheet S. If the print unit 270 is a laser printer, the fixing unit included in the print unit 270 may function as the decoloration unit 280. In other words, the decoloration unit 280 and the fixing unit included in the print unit 270 may have a common mechanism. Since they have the common mechanism, manufacturing costs of the detection apparatus 200 can be decreased.

Figure 5:
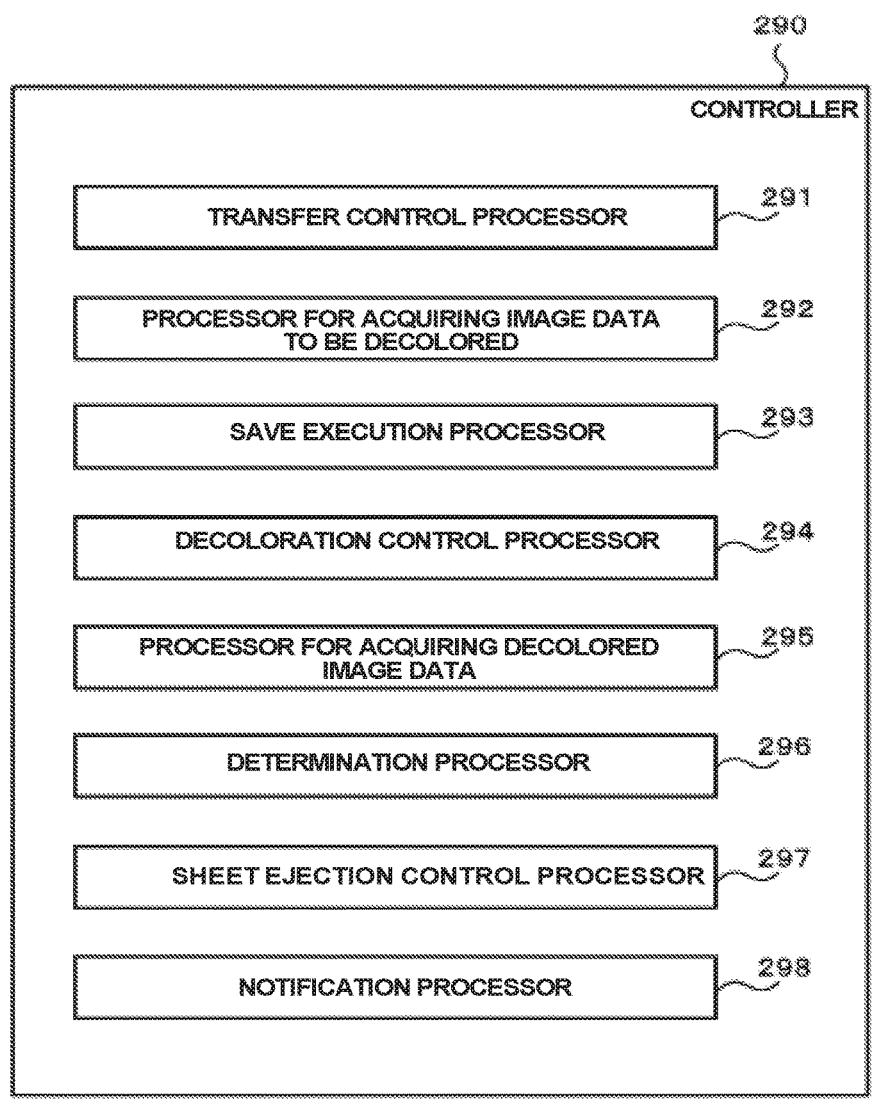
FIG. 5 is a functional block diagram of a controller within the detection apparatus of the decoloration ink image according to the first embodiment.

The controller 290 is a processing device such as a processor. The controller 290 functions as a control device for controlling the detection apparatus 200. The controller 290 operates in accordance with a program stored in a ROM (Read Only Memory) or a RAM (Random Access Memory) (not shown), thereby realizing a variety of operations including detection processing as described later. The controller 290 operates in accordance with the program to function as a transfer control processor 291, a processor 292 for acquiring image data to be decolored, a save execution processor 293, a decoloration control processor 294, a processor 295 for acquiring decolored image data, a determination processor 296, a sheet ejection control processor 297, and a notification processor 298, as shown in FIG. 5. The operations of the above-described processors 291 to 298 will be described in detail in the description about detection processing later. Note that the controller 290 may be configured of one controller, or of a plurality of controllers. If the controller 290 is configured of a plurality of the controllers, the controller 290 may realize the detection processing by cooperating a plurality of the controllers. The detection apparatus 200 further includes a sheet transfer unit 150. The sheet transfer unit 150 is a device for transferring the sheet S to each part of the detection apparatus 200. The sheet transfer unit 150 includes, for example, a transfer path for transferring the sheet S, transfer rollers, and motors for rotating the transfer rollers. The sheet transfer unit 150 transfers the sheet S, on which the image is read by the image reading unit 250 before the decoloration processing, to the decoloration unit 280, for example. The sheet transfer unit 150 returns the sheet S after the decoloration processing to the sheet feeding unit 240, for example. The sheet transfer unit 150 transfers the sheet S, on which the image is read by the image reading unit 250 after the decoloration processing, to the print unit 270 or the sheet ejection unit 260. Furthermore, the sheet transfer unit 150 transfers the sheet S, on which the image is printed by the print unit 270, to the sheet ejection unit 260.

Next, the operation of the detection apparatus 200 having the above-described configurations will be described.

In the detection apparatus 200, once the sheet S to be detected is set on the sheet feeding tray 241 and a user instructs the start of the processing, the detection processing by the controller 290 is started. The detection processing is to detect whether or not the decoloration ink is used on the sheet S, i.e., to detect the presence or absence of the decoloration ink image. The start of the processing is instructed by the user, for example, through an operation panel (not shown) included in the detection apparatus 200. Hereinafter, referring to the flow chart shown in FIG. 6, the detection processing will be described.

Figure 6:
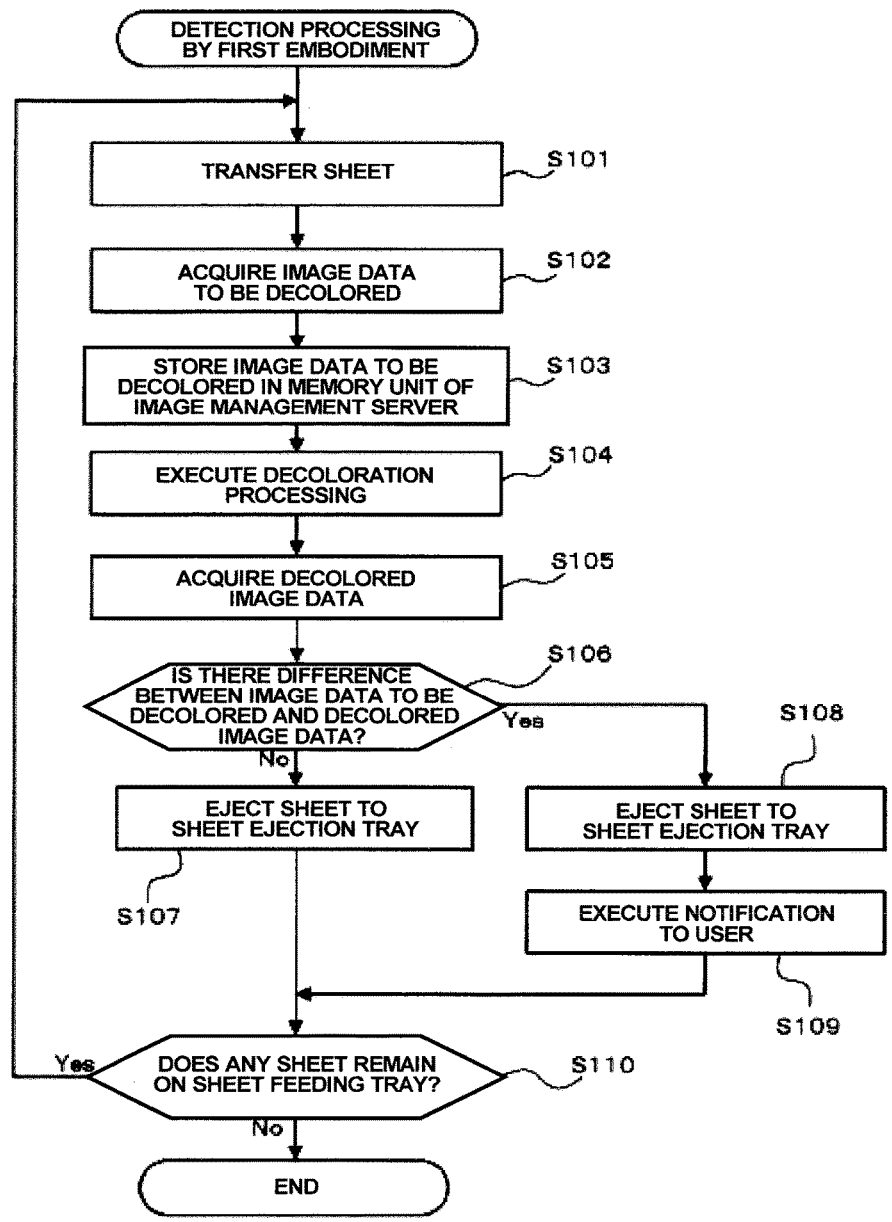
FIG. 6 is a flow chart showing detection processing by the detection apparatus of the decoloration ink image according to the first embodiment.

In Step S101 shown in FIG. 6, the transfer control processor 291 controls the sheet feeding unit 240, and picks up one sheet S from the sheet feeding tray 241. Then, the transfer control processor 291 transfers the sheet S picked up by controlling the transfer rollers (not shown) to the image reading unit 250.

Once the sheet S is transferred to the image reading unit 250, the controller 290 proceeds to Step S102. In Step S102, the processor 292 for acquiring image data to be decolored controls the image reading unit 250, and reads the image from the sheet S. Further, the processor 292 for acquiring image data to be decolored temporarily stores the image data read in the memory unit 230.

In the description below, the image acquired by the processor 292 for acquiring image data to be decolored is called as image data to be decolored. An image data format of the image data to be decolored is not limited to a specific format. For the image data format of the image data to be decolored, a variety of known formats such as a bitmap, a JPEG (Joint Photographic Experts Group), a GIF (Graphics Interchange Format), a PNG (Portable Network Graphics) and a PDF (Portable Document Format) can be used. It should be appreciated that the image data format of the image data to be decolored may be the format specially developed by a manufacturer of the detection apparatus 200.

Once the image data read is temporarily stored in the memory unit 230, the controller 290 proceeds to Step S103. In Step S103, the save execution processor 293 stores the image data to be decolored acquired in Step 102 in the memory unit 110 of the image management server 100. For example, the save execution processor 293 controls the communication interface 210, and transmits the image data to be decolored temporary stored in the memory unit 230 to the image management server 100 via the network 2. When the image management server 100 receives the image data to be decolored from the detection apparatus 200, the image management server 100 systematically stores the image data to be decolored in memory unit 110 utilizing database or index.

Note that visual readability may be assured in the image data to be decolored stored by the save execution processor 293. The visual readability means that the content of the image data can be visually read easily by unaided eyes as necessary. For example, the save execution processor 293 may assure the visual readability of the image data to be decolored by converting the image data to be decolored into a standardized image data format including a bitmap, a JPEG, a GIF, a PNG, or a PDF for storing.

Once the image data to be decolored is stored in the memory unit 110, the controller 290 proceed to Step S104. In Step S104, the transfer control processor 291 controls the sheet transfer unit 150, and transfers the sheet S to the decoloration unit 280. In Step S104, the decoloration control processor 294 controls the decoloration unit 280, and heats the sheet S at the decoloration temperature or more. By the heat, a chemical structure of the decoloration ink is changed, the decoloration ink image section is decolored from the sheet S. Once the decoloration processing is completed, the transfer control processor 291 controls the sheet transfer unit 150, and returns the sheet S to the image reading unit 250.

Once the sheet S is returned to the image reading unit 250, the controller 290 proceeds to Step S105. In Step S105, the processor 295 for acquiring decolored image data controls the image reading unit 250, and reads the image from the sheet S. The processor 295 for acquiring decolored image data temporary stores the image data read in the memory unit 230. In the description below, the image acquired by the processor 295 for acquiring decolored image data is called as the decolored image data. An image data format of the decolored image data is not limited to a specific format. For example, for the image data format of the decolored image data, a variety of known formats such as a bitmap, a JPEG, a GIF, a PNG and a PDF can be used. It should be appreciated that the image data format of the decolored image data may be the format specially developed by a manufacturer of the detection apparatus 200. Once the decolored image data is temporary stored, the transfer control processor 291 controls the sheet transfer unit 150, and transfers the sheet S to the sheet ejection unit 260.

Once the sheet S is transferred to the sheet ejection unit 260, the controller 290 proceeds to Step S106. In Step S106, the determination processor 296 determines whether or not the decoloration ink is used on the sheet S. Specifically, the determination processor 296 determines whether or not there is a difference between the image data to be decolored acquired in Step S102 and the decolored image data acquired in Step S105. For example, the determination processor 296 compares both images by defining the image data to be decolored as a first data row and the decolored image data as a second data row, and calculates a correlation coefficient. If the correlation coefficient is smaller than the threshold value set in advance, the determination processor 296 determines that the decoloration ink is used on the sheet S. If the correlation coefficient is greater than the threshold value set in advance, the determination processor 296 determines that no decoloration ink is used on the sheet S. In this case, the determination processor 296 may execute filtering for removing noises from the image data in order to improve the accuracy of the determination before two image datas are compared (for example, before the correlation coefficient is calculated). The above-described method is illustrative. The determination processor 296 can determine whether or not there is a difference between two image datas by using a variety of known methods.

If there is no difference between the image data to be decolored and the decolored image data (Step S106: No), the controller 290 proceeds to Step S107. In Step S107, the sheet ejection control processor 297 controls the sheet ejection unit 260, and ejects the sheet S to any of the sheet ejection trays of the stacker 261. For example, the sheet ejection control processor 297 may eject the sheet S to the uppermost sheet ejection tray 261*a* or may eject the sheet S to the lowermost sheet ejection tray 261*d*. At this time, the notification processor 298 may control the output unit 220 to notify the user that no decoloration ink is used on the sheet S.

If there is a difference between the image data to be decolored and the decolored image data (Step S106: Yes), the controller 290 proceeds to Step S108. In Step S108, the sheet ejection control processor 297 controls the sheet ejection unit 260, and ejects the sheet S to any of the sheet ejection trays of the stacker 261. At this time, the sheet ejection control processor 297 ejects the sheet S to the sheet ejection tray different from that used in the case that there is no difference between the image data to be decolored and the decolored image data. For example, if the sheet ejection tray used in Step S107 is set to the sheet ejection tray 261*a*, the sheet ejection control processor 297 ejects the sheet S to any of the sheet ejection trays 261*b* to 261*d*.

The sheet ejection control processor 297 may change a sheet ejection tray to which the sheet S is ejected based on a certainty factor of the use of the decoloration ink. For example, if the certainty factor is greater than the threshold value set in advance, the sheet ejection control processor 297 ejects the sheet S to the sheet ejection tray 261*b* as the possibility that the decoloration ink is used on the sheet S (the possibility that the decoloration ink image is present in the sheet S) is extremely high. If the certainty factor is, for example, smaller than the threshold value set in advance, the sheet ejection control processor 297 ejects the sheet S to the sheet ejection tray 261*c* as the possibility that the decoloration ink is used on the sheet S is present. The above-described certainty factor shows the level of the possibility that the decoloration ink is used. The sheet ejection control processor 297 may take an inverse number of the correlation number calculated by the determination processor 296 in Step S106 as the certainty factor. A plurality of the threshold values may be set to determine the sheet ejection trays to which the sheets S are ejected. The sheet ejection control processor 297 may classify and eject the sheets S into three or more sheet ejection trays based on the certainty factor and the threshold values.

Once the sheet S is ejected to the sheet ejection tray, the controller 290 proceeds to Step S109. In Step S109, the notification processor 298 controls the output unit 220, and notifies the user that the decoloration ink is used on the sheet S. For example, the notification processor 298 may display characters or an image, which shows that the decoloration ink is used, on a display device. Also, the notification processor 298 may output a sound, which means that the decoloration ink is used, to a speaker. It should be appreciated that the notification processor 298 may output simply a buzzer sound, or may light a lighting device.

After the sheet S is ejected in the above-described Step, or after the notification in Step 109, the controller 290 proceeds to Step S110. In Step S110, the transfer control processor 291 determines that the sheet S remains on the sheet feeding tray 241 using a sensor (not shown). If the sheet S remains on the sheet feeding tray 241 (Step S110: Yes), the controller 290 returns to Step S101. If no sheet S remains on the sheet feeding tray 241 (Step S110: No), the controller 290 ends the detection processing.

According to the first embodiment, the processor 292 for acquiring image data to be decolored acquires the image data before the execution of the decoloration processing, the processor 295 for acquiring decolored image data acquires the image data after the execution of the decoloration processing, and the determination processor 296 determines whether or not there is a difference between the image data before the execution of the decoloration processing and the image data after the execution of the decoloration processing. In this way, the user can know easily whether or not the decoloration ink is used on the sheet S.

In addition, if there is a difference between the image data to be decolored and the decolored image data, the detection apparatus 200 according to the first embodiment ejects the sheet S to the sheet ejection tray different from that used in the case that there is no difference between the image data to be decolored and the decolored image data. In this way, the user can pick up easily the sheet S on which the decoloration ink is used from a number of the sheets S.

If the decoloration processing is executed, the decoloration ink image section is decolored. In other words, the description with the decoloration ink is erased from the sheet S. Accordingly, after the detection processing is executed, even if the user tries to identify the description with the decoloration ink, it is extremely difficult for him to identify what is written. However, as the detection apparatus 200 according to the first embodiment stores the image data before the decoloration processing is executed in the memory unit 110 of the image management server 100, the user can identify easily the decoloration ink image section, i.e., the description with the decoloration ink, even after the detection processing is executed.

Embodiment 2

The detection apparatus 200 according to the first embodiment erases the description with the decoloration ink by decoloring the decoloration ink image section from the sheet S during the detection processing is executed. Therefore, no evidence that the decoloration ink is used is left on the sheet S. Although the detection apparatus 200 according to the first embodiment stores the image data to be decolored in the image management server 100, electronic data is changed easily and does not constitute a competent evidence. Therefore, it is extremely difficult for the user of the detection apparatus 200 to prove that the decoloration ink is used on the sheet S after the detection processing is executed. The detection apparatus 200 according to the second embodiment stores the image data to be decolored together with a time stamp token issued from a time stamp agent, which allows the user to prove easily that the decoloration ink is used on the sheet S.

The time stamp token is information that combines a hash value of the electronic data to which the time stamp is issued with reliable accurate time information. The time stamp token proves that the electronic data of interest is present with certainty before the time stamp is generated. The time stamp token is issued by the time stamp agent. A time stamp service provided by the time stamp agent is standardized by ISO/IEC 18014, RFC3161 of IETF (Internet Engineering Task Force) and ETSI (European Telecommunications Standards Institute) TS 101 861.

Figure 7:
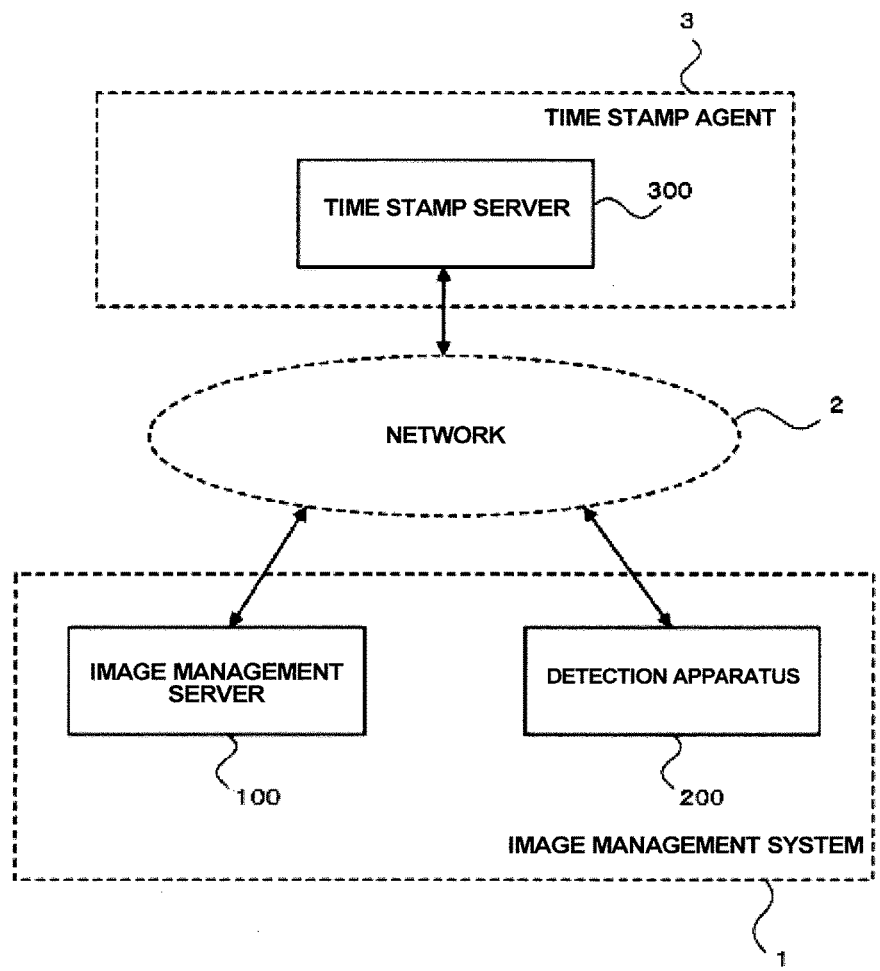
FIG. 7 is an image management system including a detection apparatus of a decoloration ink image according to a second embodiment.

Hereinafter, the image management system 1 including the detection apparatus 200 according to the second embodiment will be described. The image management system 1 includes the image management server 100, and the detection apparatus 200, as shown in FIG. 7. The detection apparatus 200 is connected to the image management server 100 and a time stamp server 300 of the time stamp agent 3 via the network 2. The time stamp agent 3 is an agent that issues the time stamp token. The time stamp server 300 is a server device such as a PC server, a UNIX (registered trademark) server and a main frame. As the configuration of the image management server 100 is same as that according to the first embodiment, the description thereof is thus omitted.

Similar to the detection apparatus 200 according to the first embodiment, the detection apparatus 200 according to the second embodiment includes the communication interface 210, the output unit 220, the memory unit 230, the sheet feeding unit 240, the image reading unit 250, the sheet ejection unit 260, the print unit 270, the decoloration unit 280, the sheet transfer unit 150, and the controller 290.

Figure 8:
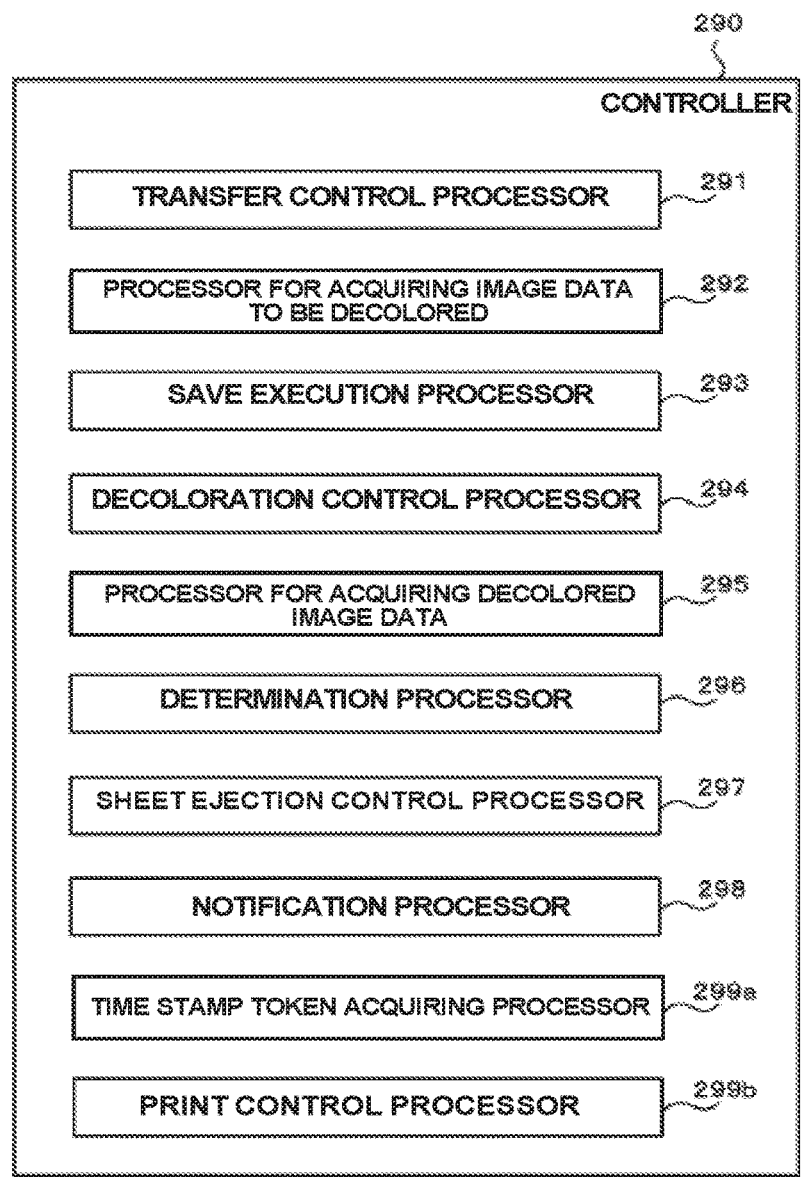
FIG. 8 is a functional block diagram of a controller within the detection apparatus of the decoloration ink image according to the second embodiment.

The controller 290 has functions as a time stamp token acquiring processor 299a and a print control processor 299b as shown in FIG. 8 in addition to the functions as the above-described processors 291 to 298. As other configurations of the detection apparatus 200 according to the second embodiment are same as those according to the first embodiment, the description thereof is thus omitted.

Next, the operation of the detection apparatus 200 having the above-described configurations will be described.

Once the sheet S to be detected is set on the sheet feeding tray 241 and the user instructs the detection apparatus 200 to start the processing, the controller 290 starts the detection processing. In the second embodiment, the sheet S set to the sheet feeding tray 241 is one for easy understanding. Hereinafter, referring to the flow chart shown in FIG. 9, the detection processing will be described.

Figure 9:
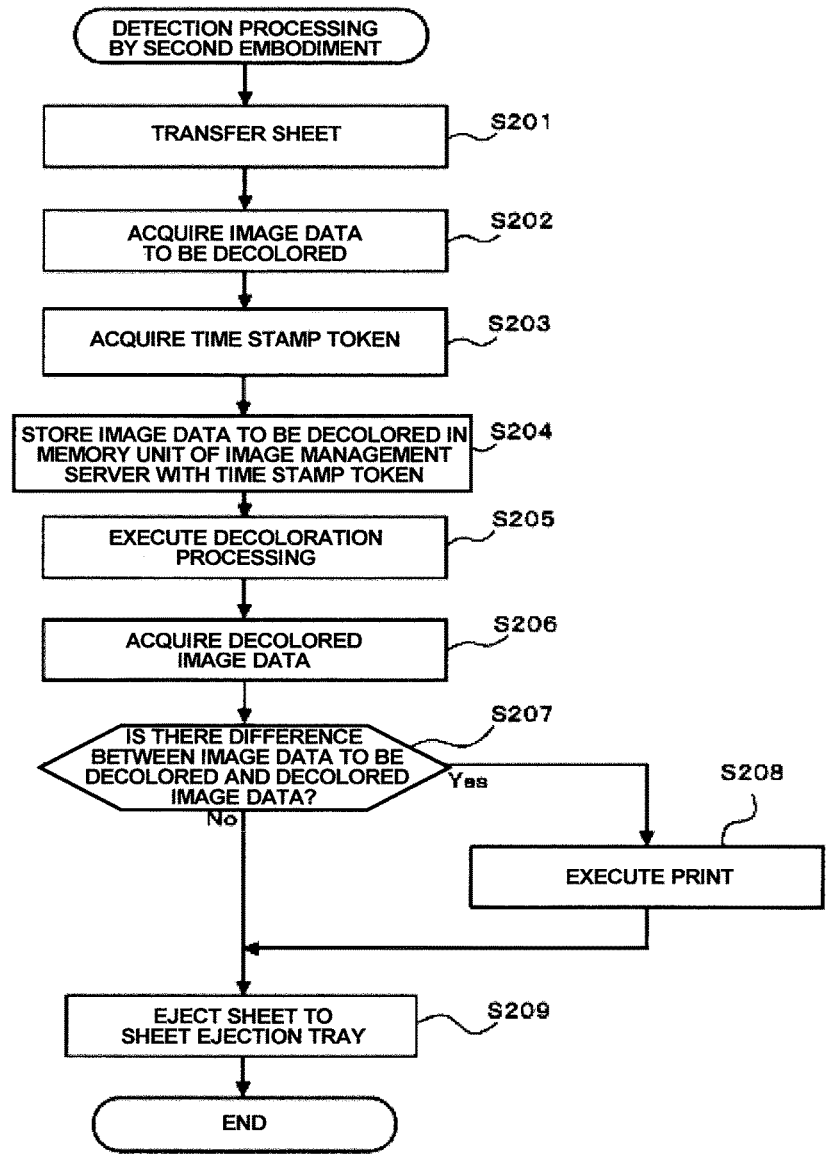
FIG. 9 is a flow chart showing detection processing by the detection apparatus of the decoloration ink image according to the second embodiment.

In Step S201 shown in FIG. 9, the transfer control processor 291 controls the sheet feeding unit 240, and picks up one sheet S from the sheet feeding tray 241. Then, the transfer control processor 291 transfers the sheet S picked up by controlling the transfer rollers (not shown) to the image reading unit 250.

Once the sheet S is transferred to the image reading unit 250, the controller 290 proceeds to Step S202. In Step S202, the processor 292 for acquiring image data to be decolored controls the image reading unit 250, and reads the image from the sheet S. Further, the processor 292 for acquiring image data to be decolored temporary stores the image data read in the memory unit 230 as the image data to be decolored.

Once the image data to be decolored is temporary stored, the controller 290 proceeds to Step S203. In Step S203, the time stamp token acquiring processor 299a acquires the time stamp token including the image data to be decolored from the time stamp agent 3. For example, the time stamp token acquiring processor 299a executes the following processing.

Firstly, the time stamp token acquiring processor 299a calculates the hash value of the image data to be decolored. The time stamp token acquiring processor 299a may add a digital signature to the image data to be decolored before the hash value is calculated. At this time, the detection apparatus 200 may store in advance a signing key (secret key) used for the digital signature in the memory unit 230. Also, the time stamp token acquiring processor 299a may acquire the signing key (secret key) from the image management server 100 or a server device (not shown) via the network 2. The time stamp token acquiring processor 299a transmits the calculated hash value to the time stamp server 300 of the time stamp agent 3.

Once the time stamp server 300 acquires the hash value from the detection apparatus 200, the hash value acquired is combined with time information. The time information combined with the hash value is acquired by the time stamp server 300 from a time agent. The time agent is an agent for issuing accurate time information. If a digital signature method is used, the time stamp server 300 adds the digital signature to the information where the hash value is combined with the time information to generate the time stamp token. The method to generate the time stamp token by the time stamp server 300 is not limited to the digital signature method. The time stamp token may be generated using an archiving method or a link token method. Then, the time stamp server 300 transmits the generated time stamp token to the detection apparatus 200.

The time stamp token acquiring processor 299a receives the time stamp token, and temporary stores the received time stamp token in the memory unit 230.

Once the time stamp token is temporary stored, the controller 290 proceeds to Step S204. In Step S204, the save execution processor 293 stores the image data to be decolored acquired in Step 202 in the memory unit 110 of the image management server 100 together with the time stamp token acquired in Step S203. At this time, the save execution processor 293 may add the time stamp token to the image data to be decolored, assemble the time stamp token and the image data to be decolored into one file, and store the file to memory unit 110. It should be appreciated that the save execution processor 293 may store the time stamp token and the image data to be decolored as separate files.

Once the image data to be decolored is stored together with the time stamp token, the controller 290 proceeds to Step S205. In Step S205, the transfer control processor 291 controls the sheet transfer unit 150, and transfers the sheet S to the decoloration unit 280. In Step S205, the decoloration control processor 294 controls the decoloration unit 280, and heats the sheet S at the decoloration temperature or more. In this way, the decoloration ink image section is decolored, and the description with the decoloration ink is erased from the sheet S. Once the decoloration processing is completed, the transfer control processor 291 controls the sheet transfer unit 150, and returns the sheet S to the image reading unit 250.

Once the sheet S returns to the image reading unit 250, the controller 290 proceeds to Step S206. In Step S206, the processor 295 for acquiring decolored image data controls the image reading unit 250, and reads the image from the sheet S. Then, the processor 295 for acquiring decolored image data temporary stores the image data read in the memory unit 230 as the decolored image data.

Figure 10:
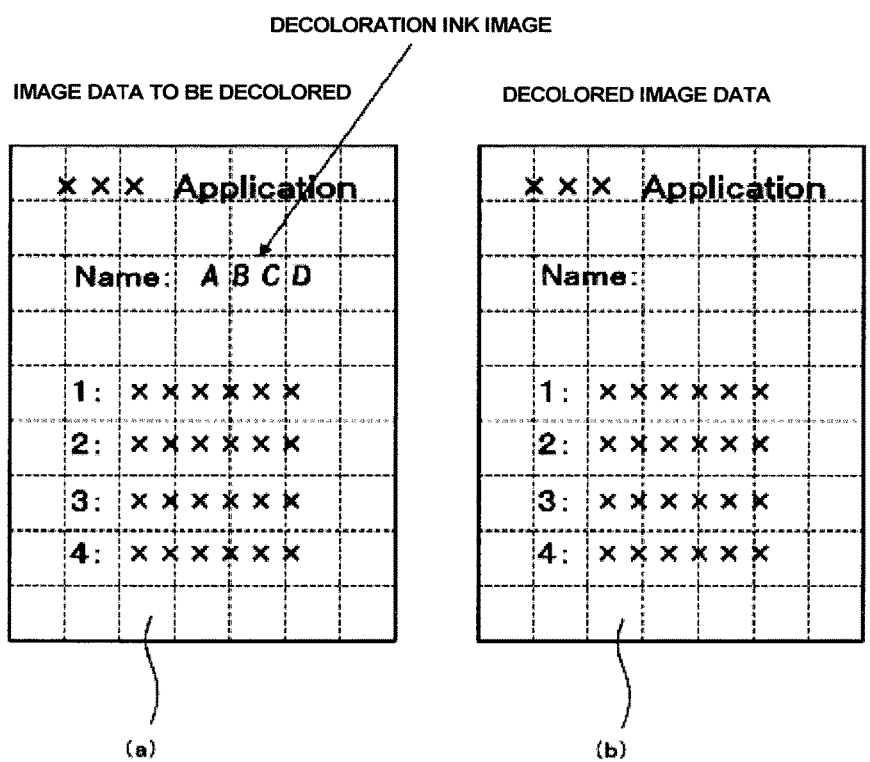
FIG. 10 shows examples of image data to be decolored and decolored image data in the second embodiment.

Once the decolored image data is temporary stored in the memory unit 230, the controller 290 proceeds to Step S207. In Step S207, the determination processor 296 compares the image data to be decolored and the decolored image data to determine whether or not the decoloration ink is used on the sheet S, similar to Step S106 in the first embodiment. The determination method may be the same as described in Step S106 in the first embodiment. At this time, the determination processor 296 also determines the decoloration ink image section. For example, the determination processor 296 divides the image data to be decolored and the decolored image data into a plurality of blocks, as shown in FIG. 10. The size of one block may be changed based on a setting by the user. Then, the determination processor 296 calculates the correlation coefficient between the blocks corresponding to the image data to be decolored and the decolored image data. For example, the blocks (a) correspond to the blocks (b) shown in FIG. 10. The determination processor 296 specifies the blocks having the correlation coefficients smaller than the threshold value set in advance, and determines a section where the specified blocks are positioned as the decoloration ink image section. In the example shown in FIG. 10, three blocks including a character string "ABCD" next to a character string "Name" is the decoloration ink image section.

If there is no difference between the image data to be decolored and the decolored image data (Step S207: No), the controller 290 proceeds to Step S209.

Figure 11A:
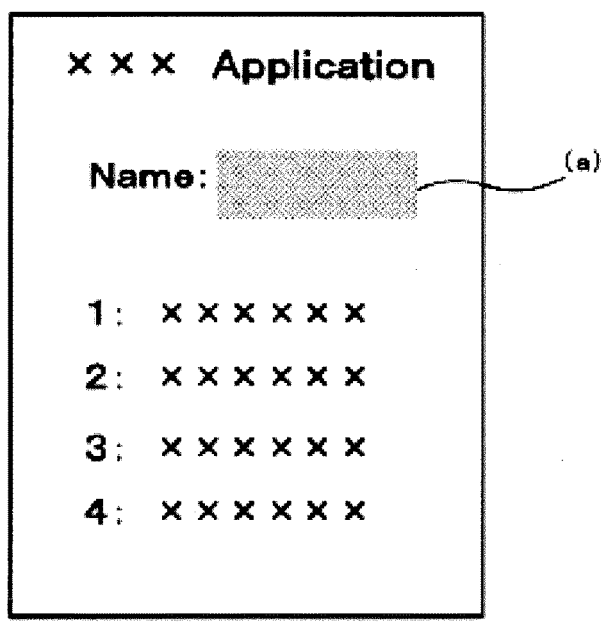
FIGS. 11A and 11B show that the detection apparatus of the decoloration ink image in the second embodiment prints a highlight image in a decoloration ink image section.
Figure 11B:
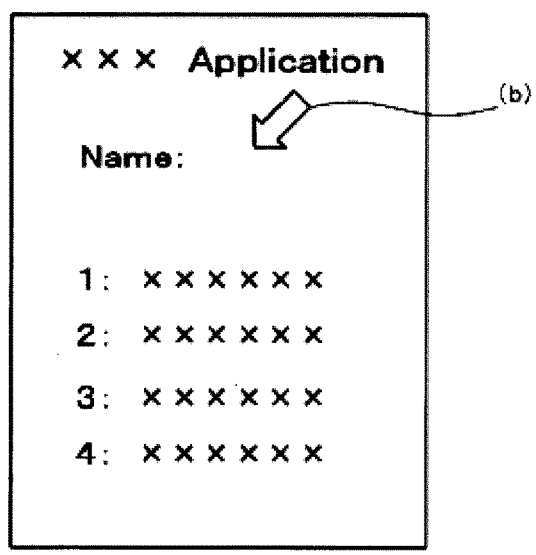

If there is a difference between image data to be decolored and the decolored image data (Step S207: Yes), the controller 290 proceeds to Step S208. In Step S208, the transfer control processor 291 controls the sheet transfer unit 150, and transfers the sheet S to the print unit 270. The print control processor 299b controls the print unit 270, and prints the highlight image at the decoloration ink image section where the sheet S is decolored. The highlight image is a display image for the user to specify the decoloration ink image section. For example, the print control processor 299b prints a pattern (a) set in advance (for example, a mesh pattern) on the decoloration ink image section specified in Step S207 as the highlight image, as shown in FIG. 11A. The highlight image is not limited to the mesh pattern. The highlight image may be, for example, a stripe pattern or a dotted pattern other than the mesh pattern. Also, the highlight image may be, for example, an arrow (b) showing the decoloration ink image section decolored, as shown in FIG. 11B. After the highlight image is printed on the sheet S, the transfer control processor 291 controls the sheet transfer unit 150, and transfers the sheet S to the sheet ejection unit 260.

Once the sheet S is transferred to the sheet ejection unit 260, the controller proceeds to Step S209. In Step S209, the sheet ejection control processor 297 controls the sheet ejection unit 260, and ejects the sheet S to any of the sheet ejection trays of the stacker 261. At this time, the sheet ejection control processor 297 ejects the sheet S to the different sheet ejection trays in the case that there is a difference between the image data to be decolored and the decolored image data or in the case that there is no difference between the image data to be decolored and the decolored image data. The sheet ejection control processor 297 may change the sheet ejection tray from which the sheet S is ejected based on the certainty factor of the use of the decoloration ink. The certainty factor may be the number of the blocks that are determined as part of the decoloration ink image section in Step S209.

Once the sheet S is ejected to the sheet ejection tray, the controller 290 ends the detection processing.

According to the second embodiment, the time stamp token acquiring processor 299a acquires the time stamp token of the image data to be decolored from the time stamp agent 3, and the save execution processor 293 stores the image data to be decolored together with the time stamp token. Therefore, if the decoloration ink is used on the sheet S, the user of the detection apparatus 200 can prove easily that the decoloration ink is used on the sheet S.

In addition, the determination processor 296 specifies the decoloration ink image section decolored, and the print control processor 299b prints the highlight image on the sheet S for the user to specify the decoloration ink image section. Accordingly, the user of the detection apparatus 200 can specify easily the decoloration ink image section.

Embodiment 3

The detection apparatuses 200 according to the first embodiment or the second embodiment includes the decoloration apparatus (decoloration unit 280) and the image reading apparatus (image reading unit 250). However, the decoloration apparatus and the image reading apparatus may be separated from the detection apparatus 200. Hereinbelow, the image management system 1 having the decoloration apparatus and the image reading apparatus separated from the detection apparatus 200 will be described.

Figure 12:
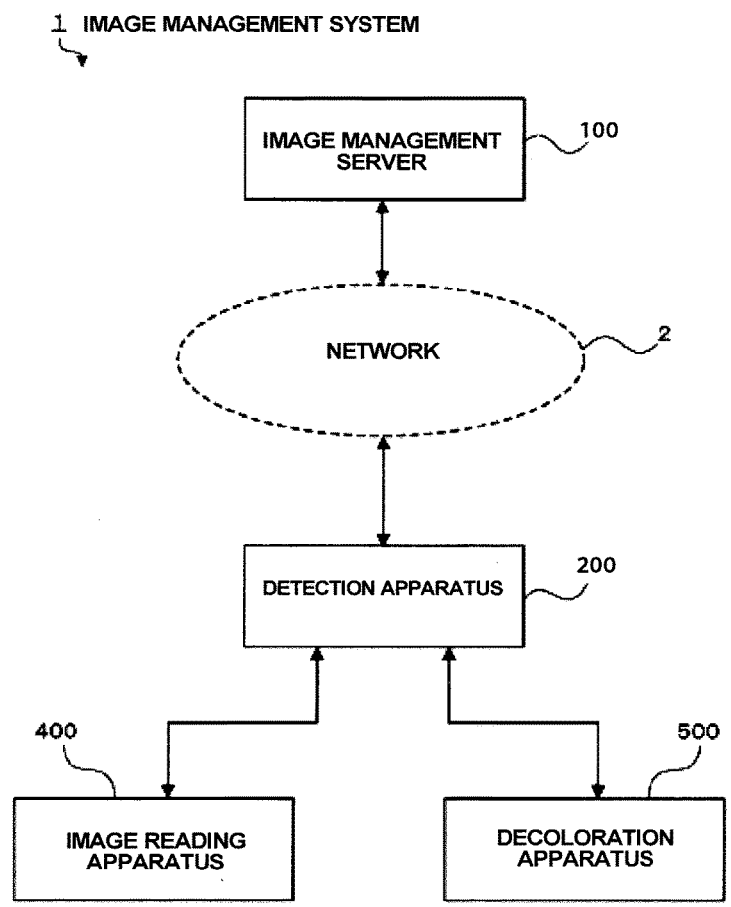
FIG. 12 is an image management system including a detection apparatus of a decoloration ink image according to a third embodiment.

The image management system 1 includes the image management server 100, the detection apparatus 200, an image reading apparatus 400, and a decoloration apparatus 500, as shown in FIG. 12. The image reading apparatus 400 is an image capturing apparatus such as a scanner and a camera, for example. The decoloration apparatus 500 is an apparatus for heating the sheet S at the decoloration temperature or more. The decoloration apparatus 500 may be a heating apparatus including a heat roller and a pressure roller similar to the decoloration unit 280 in the first embodiment. The image reading apparatus 400 and the decoloration apparatus 500 are connected to the detection apparatus 200 via wire or wireless. As the configuration of the image management server 100 is same as those according to the first embodiment and the second embodiment, the description thereof is thus omitted.

Figure 13:
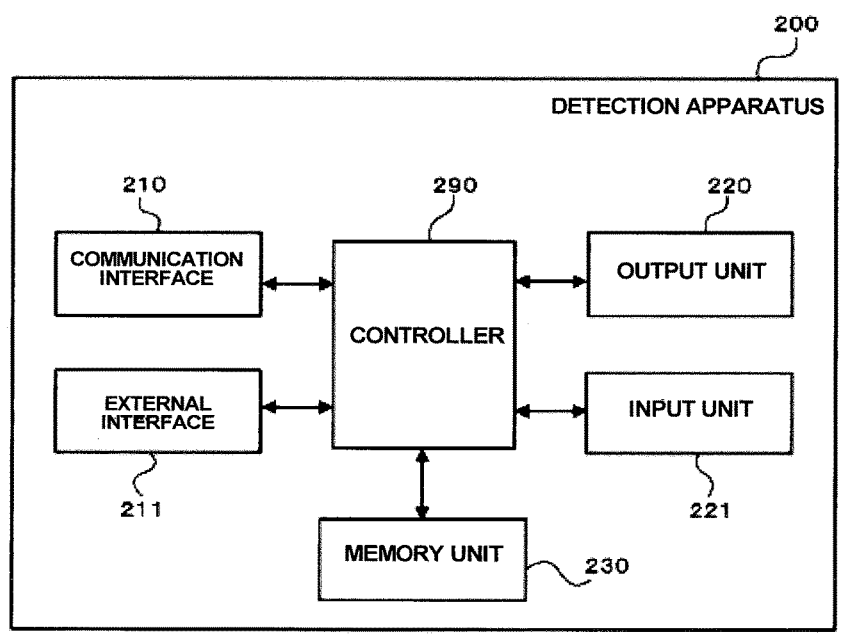
FIG. 13 is a block diagram of the detection apparatus of the decoloration ink image according to the third embodiment.

The detection apparatus 200 is an apparatus for detecting the use of the decoloration ink on the sheet where the use of the decoloration ink is not allowed. The detection apparatus 200 is a personal computer, for example. The detection apparatus 200 includes the communication interface 210, an external interface 211, the output unit 220, an input unit 221, and the memory unit 230, as shown in FIG. 13. As the configurations of the communication interface 210, the output unit 220, and the memory unit 230 are same as those according to the first embodiment, the description thereof is thus omitted.

The external interface 211 is a device for connecting the detection apparatus 200 to an external device. The external interface 211 functions as a communication unit of the detection apparatus 200. The external interface 211 is, for example, a USB (Universal Serial Bus) connection device for connecting to an external device via a USB cable, a LAN connection device for connecting to an external device via a LAN cable, or a wireless LAN connection device for connecting to an external device via wireless. The external interface 211 communicates with the image reading apparatus 400 and the decoloration apparatus 500 based on the control by the controller 290.

The input unit 221 is a device for acquiring information from outside. The input unit 221 is a reading device for reading information from a user interface such as a keyboard, a mouse and a touch panel, or from a recording medium such as a USB memory, a CD-ROM (Compact Disc Read Only Memory) and a flexible disc, for example. Once information is inputted to the input unit 221 from outside, the input unit 221 notifies the controller 290 of the information inputted.

Figure 14:
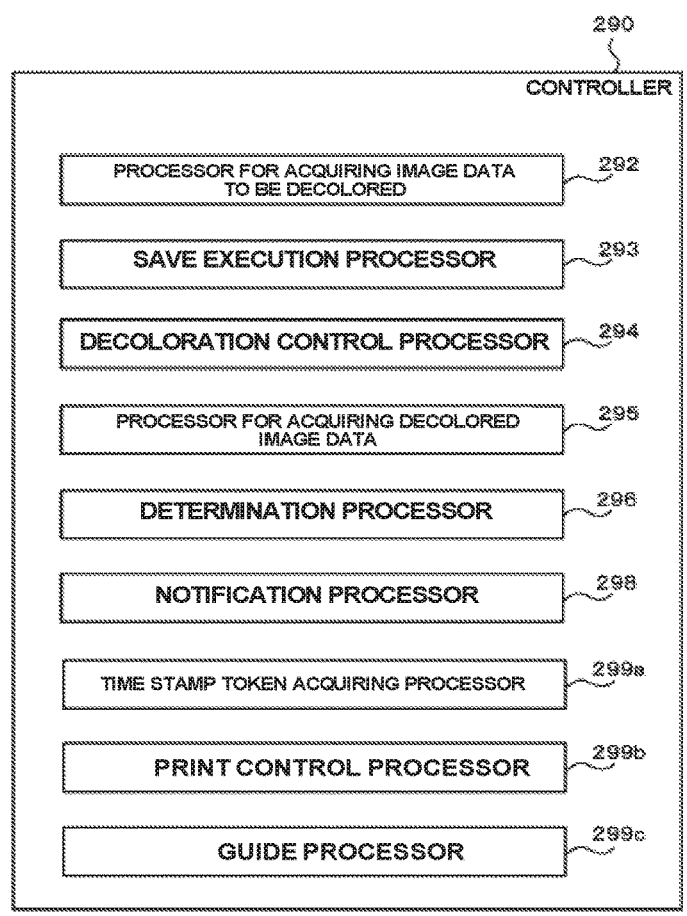
FIG. 14 a functional block diagram of a controller within the detection apparatus of the decoloration ink image according to the third embodiment.

The controller 290 is a processing device such as a processor. The controller 290 operates in accordance with a program stored in a ROM or a RAM (not shown), thereby functioning as the processor 292 for acquiring image data to be decolored, the save execution processor 293, the decoloration control processor 294, the processor 295 for acquiring decolored image data, the determination processor 296, the notification processor 298, the time stamp token acquiring processor 299a, the print control processor 299b, and the guide processor 299c, as shown in FIG. 14.

Next, the operation of the detection apparatus 200 having the above-described configuration will be described.

Once a user instructs the detection apparatus 200 to start the processing, the controller 290 starts the detection processing. Hereinafter, referring to a flow chart in FIG. 15, the detection processing will be described.

Figure 15:
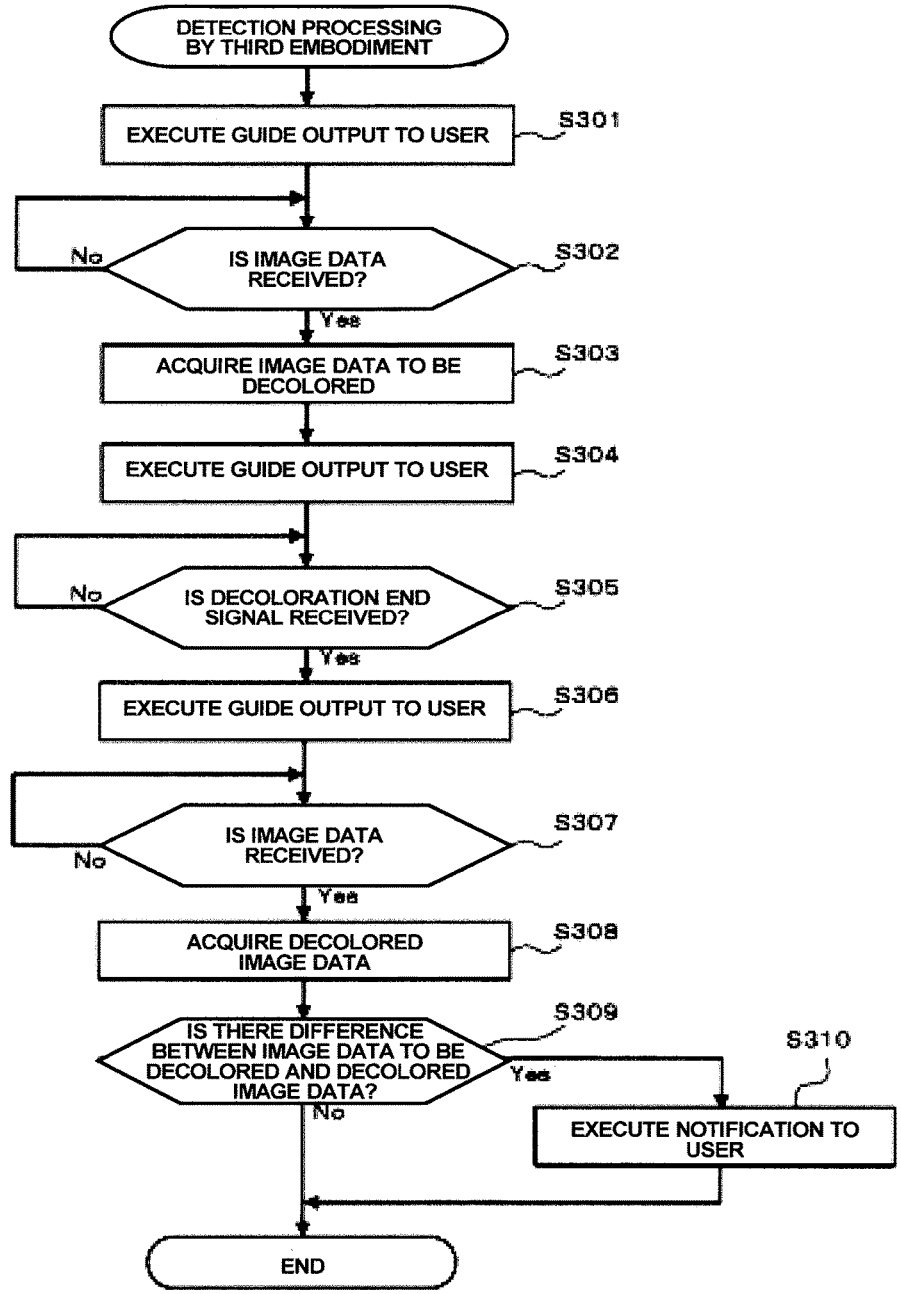
FIG. 15 is a flow chart showing detection processing by the detection apparatus of the decoloration ink image according to the third embodiment.

As shown in FIG. 15, in Step S301, a guide processor 299c controls the output unit 220, and executes the guide output to encourage the user to scan the sheet S (Step S301). The guide output may be an image display or a voice output. The user sets the sheet S on the image reading apparatus 400, and operates the image reading apparatus 400 in accordance with the guide outputted from the output unit 220. The image reading apparatus 400 reads the image of the sheet S in accordance with the operation by the user. Then, the image reading apparatus 400 transmits the image data read to the detection apparatus 200.

Once the image data is transmitted to the detection apparatus 200, the controller 290 proceeds to Step S302. In Step S302, the guide processor 299c determines whether or not the image data is received from the image reading apparatus 400. If the detection apparatus 200 does not receive the image data (Step S302: No), the guide processor 299c repeats the processing in Step S302 until the detection apparatus 200 receives the image data.

If the detection apparatus 200 receives the image data (Step S302: Yes), the controller 290 proceeds to Step S303. In Step S303, the processor 292 for acquiring image data to be decolored stores temporarily the received image data in the memory unit 230 as the image data to be decolored. At this time, the time stamp token acquiring processor 299a acquires the time stamp token including the image data to be decolored from the time stamp agent 3. Then, the save execution processor 293 stores the image data to be decolored in the memory unit 110 of the image management server 100 together with the time stamp token.

Once the image data to be decolored is stored, the controller 290 proceeds to Step S304. In Step S304, the guide processor 299c controls the output unit 220, and executes the guide output to encourage the user to perform the decoloration processing of the sheet S to be detected. The user sets the sheets S on the decoloration apparatus 500, and operates the decoloration apparatus 500 in accordance with the guide outputted from the output unit 220. The decoloration apparatus 500 executes the decoloration processing of the sheet S in accordance with the operation by the user. Also, the decoloration processing by the decoloration apparatus 500 may be controlled by the decoloration control processor 294 of the detection apparatus 200. Once the decoloration processing is ended, the decoloration apparatus 500 transmits a signal showing the end of the decoloration processing (hereinafter referred to as a decoloration end signal) to the detection apparatus 200.

Once the decoloration end signal is transmitted, the controller 290 proceeds to Step S305. In Step S305, the guide processor 299c determines whether or not the decoloration apparatus 500 receives the decoloration end signal. If the detection apparatus 200 does not receive the decoloration end signal (Step S305: No), the guide processor 299c repeats Step S305 until the detection apparatus 200 receives the decoloration end signal.

If the detection apparatus 200 receives the decoloration end signal (Step S305: Yes), the controller 290 proceeds to Step S306. In Step S306, the guide processor 299c executes again the guide output to encourage the user to scan the sheet S. The user sets the sheets S on the image reading apparatus 400, and operates the image reading apparatus 400 in accordance with the guide outputted from the output unit 220. The image reading apparatus 400 reads the image of the sheet S in accordance with the operation by the user. Then, the image reading apparatus 400 transmits the image data read to the detection apparatus 200.

Once the image read is transmitted to the detection apparatus 200, the controller 290 proceeds to Step S307. In Step S307, the guide processor 299c determines whether or not the image data is received from the image reading apparatus 400. If the detection apparatus 200 is not received the image data (Step S307: No), the guide processor 299c repeats Step S307 until the detection apparatus 200 receives the image data.

If the detection apparatus 200 receives the image data (Step S307: Yes), the controller 290 proceeds to Step S308. In Step S308, the processor 295 for acquiring decolored image data stores temporarily the received image data in the memory unit 230 as the decolored image data.

Once the decolored image data is stored temporarily, the controller 290 proceeds to Step S309. In Step S309, the determination processor 296 compares the image data to be decolored with the decolored image data to determine whether or not the decoloration ink is used on the sheet S. The determination method may be the same as that described in Step S106 in the first embodiment. At this time, the determination processor 296 may determine the decoloration ink image section using the same method as described in Step S207 according to the second embodiment.

If there is no difference between the image data to be decolored and the decolored image data (Step S309: No), the controller 290 ends the detection processing. The notification processor 298 may control the output unit 220 before the detection processing is ended, and notify the user that no decoloration ink is used on the sheet S.

If there is a difference between the image data to be decolored and the decolored image data (Step S309: Yes), the controller 290 proceeds to Step S310. In Step S310, the notification processor 298 controls the output unit 220, and notifies the user that the decoloration ink is used on the sheet S. If the image reading apparatus 400 has a printing function, the print control processor 299b may control image reading apparatus 400 to print the highlight image that specifies the decoloration ink image section on the sheet S.

Once the notification is ended, the controller 290 ends the detection processing.

According to the third embodiment, the processor 292 for acquiring image data to be decolored and the processor 295 for acquiring decolored image data acquire the image data before the decoloration processing is executed and the image data after the decoloration processing is executed, and the determination processor 296 determines whether or not there is a difference between the image data before the decoloration processing is executed and the image data after the decoloration processing is executed. In this way, similar to the first and second embodiments, the user can determine easily whether or not the decoloration ink is used on the sheet S.

The above-described embodiments have been presented by way of example only, and can be changed and applied variously.

For example, in the above-described embodiments, the decoloration ink can be decolored by heat, but another decoloration ink, which can be decolored by light including a predetermined wavelength component such as ultraviolet rays (hereinafter referred to as "erasing light"), may be used alternatively. At this time, each of the decoloration unit 280 and the decoloration apparatus 500 may be the device for irradiating the sheet S with the erasing light. Also, another decoloration ink, which can be decolored by applying the decoloration ink including the predetermined components, may be used alternatively. At this time, the decoloration unit 280 and the decoloration apparatus 500 may apply erasing ink to the sheet S.

Figure 16A:
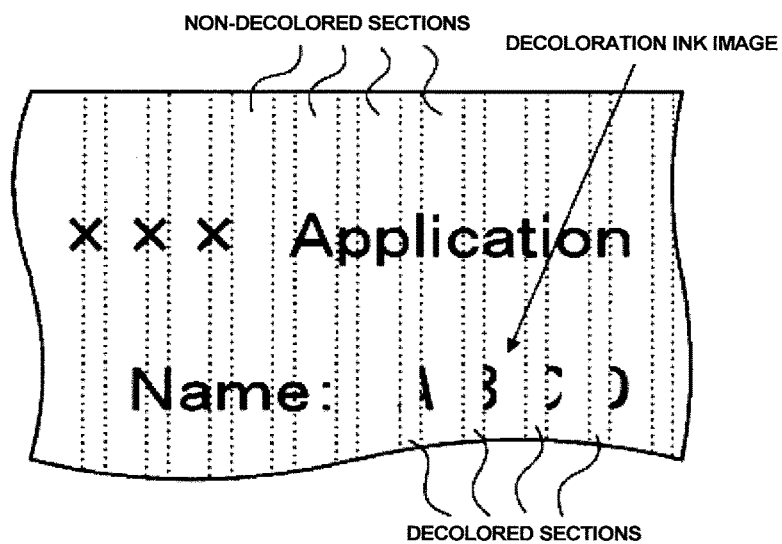
FIG. 16A is a sheet where the decoloration ink image is decolored in a stripe pattern in the third embodiment.
Figure 16B:
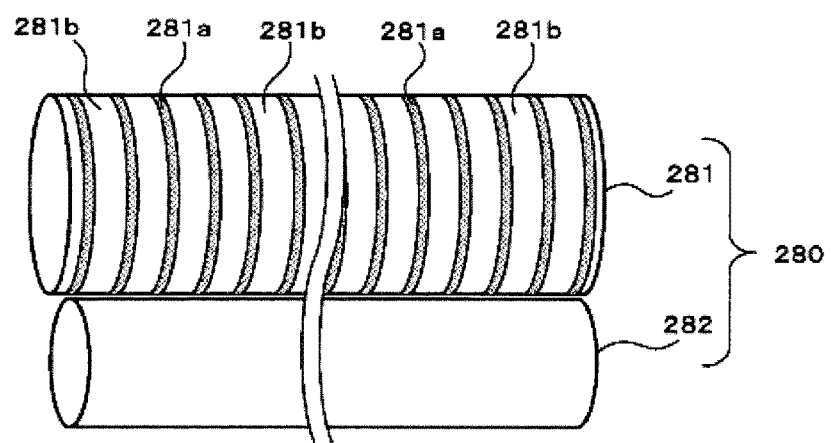
FIG. 16B is a decoloration unit that decolors the decoloration ink image of the sheet in the stripe pattern in the third embodiment.

In the above-described first and second embodiments, the decoloration unit 280 executes the decoloration processing on the entire surface of the sheet S. Alternatively, the decoloration unit 280 may decolor the sheet S in a mixed pattern. The mixed pattern is a pattern where decolored sections (sections where the decoloration processing is executed) and no-decolored sections (sections where the decoloration processing is not executed) are mixed. For example, the mixed pattern may be a stripe pattern where the decolored sections and the no-decolored sections are mixed in a stripe pattern, as shown in FIG. 16A. If the decoloration unit 280 includes the heat roller 281 and the pressure roller 282, heating sections 281a and not heating sections 281b are disposed alternately on a periphery of the heat roller 281, whereby the decoloration unit 280 can execute the decoloration processing in the stripe pattern, as shown in FIG. 16B. The configuration of the decoloration unit 280 is applicable to the decoloration apparatus 500 according to the third embodiment. Note that the stripe pattern includes not only the stripe pattern shown in a vertical stripe pattern shown in FIG. 16A, but also a horizontal or wavy stripe pattern.

If the decoloration ink can be decolored by irradiating the erasing light, the decolored sections shown in FIG. 16A may be irradiated with the erasing light. In this case, the decoloration unit 280 may be a device for irradiating the sheet S with the erasing light in the stripe pattern. For example, the decoloration unit 280 may be a device for irradiating the sheet S with laser light including the erasing light. If the decoloration ink can be decolored by applying the erasing ink, the decolored sections shown in FIG. 16A may be applied the erasing ink. In this case, the decoloration unit 280 may be a device for applying the erasing ink in the stripe pattern. For example, the decoloration unit 280 may be a device for spraying the erasing ink to the sheet S based on a principle similar to an inkjet printer. The configurations of the decoloration unit 280 are applicable to the decoloration apparatus 500 according to the third embodiment.

The mixed pattern may be a mesh pattern where base sections are the non-decolored sections and mesh sections are the decolored sections. If the decoloration unit 280 includes the heat roller 281 and the pressure roller 282, heating sections 281a are disposed in the mesh pattern on a periphery of the heat roller 281, whereby the decoloration unit 280 can execute the decoloration processing in the mesh pattern, as shown in FIG. 17B. In this case, mesh lines may not be straight, but may be wavy lines or dash lines. The wavy lines include not only sine wave lines, but also triangle wave lines. In the mesh pattern, the base sections may be the decolored sections and the mesh sections are the no-decolored sections. The configuration of the decoloration unit 280 is applicable to the decoloration apparatus 500 according to the third embodiment.

Figure 17A:
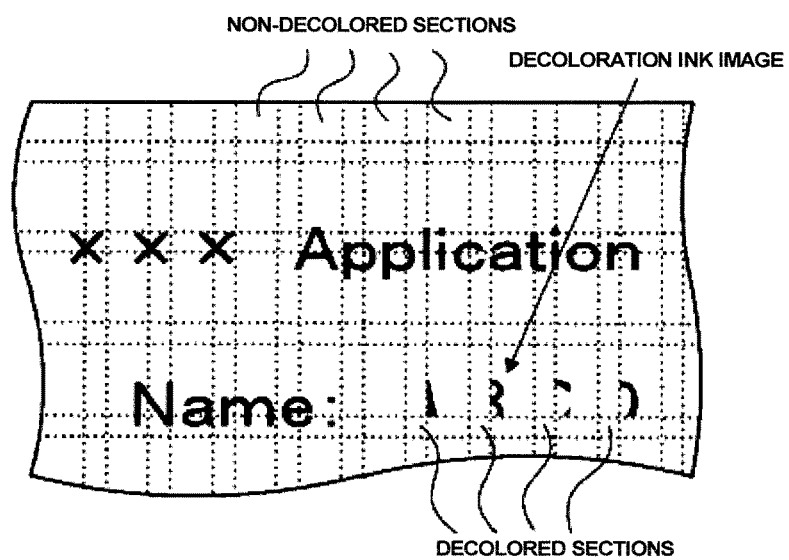
FIG. 17A a sheet where the decoloration ink image is decolored in a mesh pattern in the third embodiment.
Figure 17B:
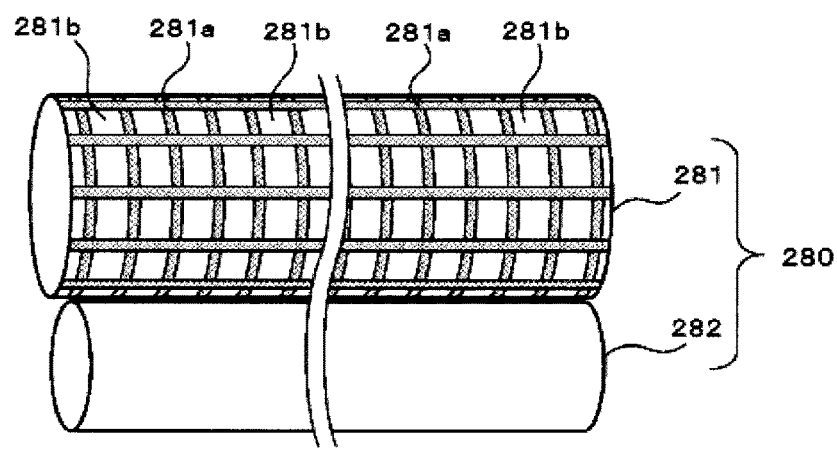
FIG. 17B is a decoloration unit that decolors the decoloration ink image of the sheet in the mesh pattern in the third embodiment.

If the decoloration ink can be decolored by irradiating with the erasing light, the decolored sections shown in FIG. 17A may be irradiated with the erasing light. In this case, the decoloration unit 280 may be a device for irradiating the sheet S with the erasing light in the mesh pattern. If the decoloration ink can be decolored by applying the erasing ink, the decolored sections shown in FIG. 17A may be applied the erasing ink. In this case, the decoloration unit 280 may be a device for applying the erasing ink in the mesh pattern. The configurations of the decoloration unit 280 are applicable to the decoloration apparatus 500 according to the third embodiment.

Also, the mixed pattern may be a dot pattern where dot decolored sections are disposed in a base section of the no-decolored sections. If the decoloration unit 280 includes the heat roller 281 and the pressure roller 282, a plurality of dotted heating sections 281a are disposed in the dot pattern on a periphery of the heat roller 281, whereby the decoloration unit 280 can execute the decoloration processing in the dot pattern, as shown in FIG. 18B. In this case, the shape of the dot is not limited to a circle. For example, the shape of the dot may be a polygonal shape such as a triangle, square, pentagonal and hexagonal shape. The shape of the dot may be a cross mark or an oval shape other than the polygonal shape. In the dot pattern, the dot sections may be the no-decolored sections and the base sections are the decolored sections. If the decoloration unit 280 includes the heat roller 281 and the pressure roller 282, the heating sections 281a and the not heating sections 281b in FIG. 18B may be inverted. The configuration of the decoloration unit 280 is applicable to the decoloration apparatus 500 according to the third embodiment.

Figure 18A:
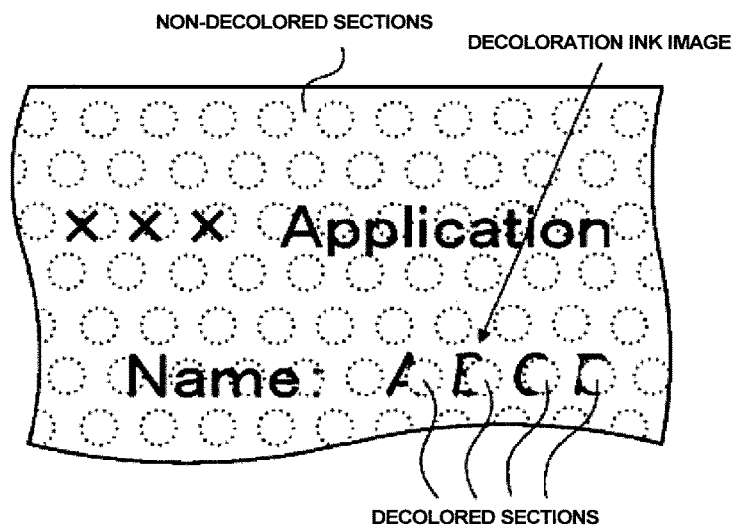
FIG. 18A a sheet where the decoloration ink image is decolored in a dotted pattern in the third embodiment.
Figure 18B:
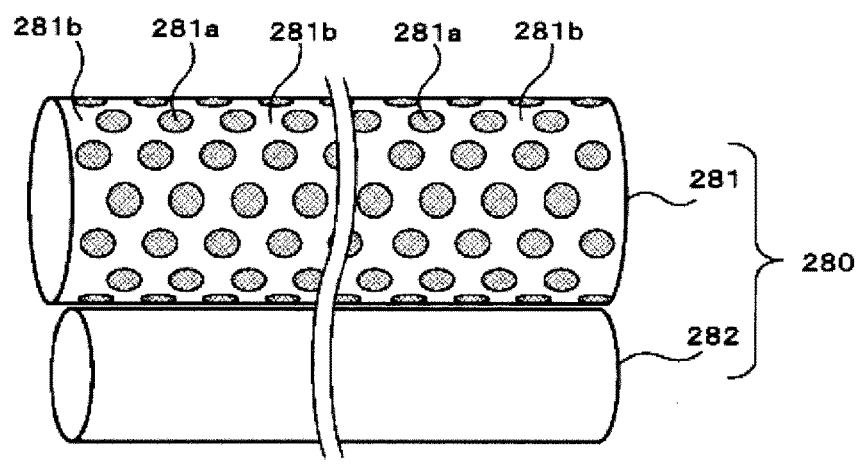
FIG. 18B is a decoloration unit that decolors the decoloration ink image of the sheet in the dotted pattern in the third embodiment.

If the decoloration ink can be decolored by irradiating the erasing light, the decolored sections shown in FIG. 18A may be irradiated with the erasing light. In this case, the decoloration unit 280 may be a device for irradiating the sheet S with the erasing light in the dot pattern. If the decoloration ink can be decolored by applying the erasing ink, the erasing ink may be applied to the decolored sections shown in FIG. 18A. In this case, the decoloration unit 280 may be a device for applying the erasing ink in the dot pattern. The configurations of the decoloration unit 280 are applicable to the decoloration apparatus 500 according to the third embodiment.

By executing the decoloration processing in the mixed pattern by the decoloration unit 280, a part of the decoloration ink image sections is left on the sheet S, as shown in FIG. 16A, FIG. 17A, and FIG. 18A. Therefore, the user of the detection apparatus 200 can prove easily that the decoloration ink is used on the sheet S.

In the above-described embodiments, the determination processor 296 calculates the correlation coefficient by defining the image data to be decolored as the first data row and the decolored image data as the second data row, determines that the decoloration ink is used on the sheet S if the correlation coefficient is smaller than the threshold value set in advance, and determines that no decoloration ink is used on the sheet S if the correlation coefficient is greater than the threshold value set in advance. However, the determination method of determining whether or not the decoloration ink is used (the presence or absence of the decoloration ink image) by the determination processor 296 is not limited thereto. For example, the determination processor 296 divides the image data to be decolored and the decolored image data into a plurality of blocks, as shown in FIG. 10. Then, the determination processor 296 calculates the correlation coefficients between the blocks of the image data to be decolored and the corresponding blocks of the decolored image data. Thereafter, the determination processor 296 specifies the blocks having the correlation coefficients smaller than the threshold value set in advance. If the number of the blocks is greater than the value set in advance, the determination processor 296 determines that the decoloration ink is used on the sheet S. If the number of the blocks is smaller than the value set in advance, the determination processor 296 determines that no decoloration ink is used on the sheet S. The determination processor 296 can determine more accurately whether or not the decoloration ink is used by comparing the images not for the whole image but for each block.

In addition, the determination processor 296 may execute an image distortion correction, a positional alignment between two images, or a color correction between two images in order to improve the accuracy of the determination before the correlation coefficient is calculated in addition to a filtering for removing noises from the image data.

In the above-described embodiments, the save execution processor 293 stores the image data to be decolored in the memory unit 110 of the image management server 100. Alternatively, the save execution processor 293 may store the image data to be decolored in a memory device external of the detection apparatus 200 different from the image management server 100. Also, the save execution processor 293 may store the image data to be decolored in a memory device (for example, memory unit 230) inside of the detection apparatus 200. At this time, the detection apparatus 200 may have an unauthorized access prevention function such as a login restriction function in order to assure confidentiality of the image data. The detection apparatus 200 may systematically store the image data utilizing a database or an index in order to improve a searching property of the image data. In this case, the detection apparatus 200 may be called as an image management apparatus.

In the second embodiment, the print control processor 299b prints the highlight image on the sheet S where the decoloration processing is executed in order that the user may specify the decoloration ink image section decolored. Note that the print control processor 299b may print the highlight image on a new sheet different from the sheet S. At this time, the print control processor 299b may print the image data to be decolored acquired by the processor 292 for acquiring image data to be decolored on the new sheet together with the highlight image. As the color of the decoloration ink image section is left on the image data to be decolored, the user can find easily the decoloration ink image section. In addition, the user can know easily the contents described with the decoloration ink.

In the first embodiment, the detection apparatus 200 does not print the highlight image on the sheet S. Alternatively, the detection apparatus 200 in the first embodiment may print the highlight image on the sheet similar to the second embodiment. The sheet on which the highlight image is printed may be the sheet S where the decoloration processing is executed, or may be a new sheet different from the sheet S.

The detection apparatus 200 in the second embodiment uses the positional information of the decoloration ink image section determined by the determination processor 296 for printing the highlight image. Note that the detection apparatus 200 may simply output the positional information of the decoloration ink image section to the output unit 220 without printing the positional information of the decoloration ink image section. Furthermore, the detection apparatus 200 may store the positional information of the decoloration ink image section in a memory device (for example, the memory unit 110 of the image management server 100 or the memory unit 230 of the detection apparatus 200).

In the third embodiment, the processor 292 for acquiring image data to be decolored and the processor 295 for acquiring decolored image data communicate with the image reading apparatus 400 to acquire the image data (the image data to be decolored and the decolored image data). Note that the method for acquiring the image data from the image reading apparatus 400 is not limited to the communication. For example, the image reading apparatus 400 reads the sheet before the decoloration processing is executed and the sheet after the decoloration processing is executed, which are tentatively stored in the recording medium such as a USB memory and a flexible disc. Next, the user may set the recording medium to the input unit 221 of the detection apparatus 200, and the processor 292 for acquiring image data to be decolored and the processor 295 for acquiring decolored image data may control the input unit 221 to read the image data from the recording medium, thereby acquiring the image data to be decolored and the decolored image data.

In the second embodiment, the sheet S set on the sheet feeding tray 241 is one. Alternatively, a plurality of the sheets S may be set on the sheet feeding tray 241. In this case, the detection apparatus 200 may be configured to repeat the detection processing similar to the detection apparatus 200 in the first embodiment.

In the first embodiment, the print unit 270 is described as the laser printer. Alternatively, the print unit 270 may be a printing device such as an inkjet printer, a thermal printer and a laser printer other than the laser printer.

In the second embodiment, the print unit 270 is also described as the laser printer. Alternatively, the print unit 270 may be a printing device such as an inkjet printer, a thermal printer and a laser printer other than the laser printer.

In the third embodiment, the image reading apparatus 400 is a separate apparatus from the decoloration apparatus 500. Alternatively, the image reading apparatus 400 may be integrated with the decoloration apparatus 500.

The control device for controlling the detection apparatus 200 according to the embodiments may be realized by a dedicated computer system or a general computer system. For example, the control device for controlling the detection apparatus 200 may be configured such that a program for executing the above-described operations is stored in a non-transitory computer readable recording medium such as an optical disc, a semiconductor memory, a magnetic tape and a flexible disc and delivered therefrom, the program is installed in a computer, and the above-described processing is executed. Also, the program may be stored in a disc device included in a server device on a network such as Internet, and may be downloaded to the computer. The above-described functions may be realized by working an OS (Operating System) with application software. In this case, the data other than the OS may be stored in a medium and delivered therefrom, or may be stored in a server device and be downloaded to a computer.

While certain embodiments have been described, these embodiments have been presented by way of example only, and are not intended to limit the scope of the inventions. Indeed, the novel methods and systems described herein may be embodied in a variety of the other forms; furthermore, various omissions, substitutions and changes in the form the methods and systems described herein may be made without departing from the spirit of the inventions. The accompanying claims and their equivalents are intended to cover such forms or modifications as would fall within the scope and spirit of the inventions.

What is claimed is:

1. A detection apparatus for detecting a decolorable ink image, comprising:

an image reading unit that generates image data by reading a sheet;

a decoloration unit that performs a decoloration processing on the sheet so that a decolorable image formed with decolorable ink on the sheet is partially decolored forming a mixed pattern of decolored sections of the decolorable image and non-decolored sections of the decolorable image, the decoloration unit including a heat roller having a plurality of heating sections and non-heating sections alternately arranged on an outer surface of the heat roller, and a pressure roller that applies pressure to the sheet conveyed between the outer surface of the heat roller and the pressure roller;

a sheet transfer unit that transfers the sheet to the image reading unit before the decoloration processing by the decoloration unit and returns the sheet to the image reading unit after the decoloration processing by the decoloration unit;

a plurality of sheet ejection trays;

a sheet ejection unit that ejects the sheet after the decoloration processing is executed to any of a plurality of the sheet ejection trays; and a controller that
  acquires a first image data generated by the image reading unit reading the sheet before the decoloration processing is executed by the decoloration unit,
  acquires a second image data generated by the image reading unit reading the sheet after the decoloration processing is executed by the decoloration unit,
  determines a difference between the first image data and the second image data,
  determines whether or not the decolorable ink is used on the sheet based on the determined difference between the first image data and the second image data, and
  controls the sheet ejection unit such that the sheet is ejected to one of the sheet ejection trays if there is a difference between the first image data and the second image data and the sheet is ejected to a different sheet ejection tray if there is no difference between the first image data and the second image data.

2. The detection apparatus for detecting a decolorable ink image according to claim 1,
  wherein the controller controls the decoloration unit, after the first image data is acquired, to execute the decoloration processing on the sheet by the decoloration unit.

3. The detection apparatus for detecting a decolorable ink image according to claim 1,
  wherein the mixed pattern is a stripe pattern.

4. The detection apparatus for detecting a decolorable ink image according to claim 1,
  wherein the controller controls the image reading unit to generate the first image data, and again controls the image reading unit to generate the second image data.

5. The detection apparatus for detecting a decolorable ink image according to claim 1,
  further comprising a memory device that stores the first image data.

6. The detection apparatus for detecting a decolorable ink image according to claim 5,
  wherein the controller acquires a time stamp token of the first image data, and stores the first image data together with the time stamp token.

7. The detection apparatus for detecting a decolorable ink image according to claim 1,
  further comprising a print unit that prints a highlight image on the sheet after the decoloration processing is executed.

8. The detection apparatus for detecting a decolorable ink image according to claim 7,
  wherein the controller controls the print unit such that the highlight image is printed on the decolorable image after the decoloration processing is executed in the case that there is a difference determined between the first image data and the second image data.

9. A method of detecting a decolorable ink image printed with decolorable ink, comprising:
  transferring a sheet to an image reading unit;
  generating first image data of a sheet before performing a decoloration processing;
  after the first image data is generated, performing the decoloration processing on the sheet with a decoloration unit so that a decolorable image formed with decolorable ink on the sheet is partially decolored forming a mixed pattern of decolored sections of the decolorable image and non-decolored sections of the decolorable image, the decoloration unit including a heat roller having a plurality of heating sections and non-heating sections alternately arranged on an outer surface of the heat roller, and a pressure roller that applies pressure to the sheet conveyed between the outer surface of the heat roller and the pressure roller;
  returning the sheet on which the image is decolored to the image reading unit;
  generating second image data of the sheet after performing the decoloration processing;
  determining a difference between the first image data and the second image data;
  determining whether or not the decolorable ink is used on the sheet based on the determined difference between the first image data and the second image data; and
  transferring the sheet to one of a plurality of sheet ejection trays based on the determination of whether the decoloration ink is used.

* * * * *